(12) United States Patent
Bradshaw

(10) Patent No.: US 8,949,357 B2
(45) Date of Patent: Feb. 3, 2015

(54) AD HOC GROUP CHAT USING A SOCIAL NETWORKING SERVICE

(71) Applicant: Blether Labs LLC, Old Saybrook, CT (US)

(72) Inventor: Kevin John Bradshaw, Old Saybrook, CT (US)

(73) Assignee: Blether Labs LLC, Old Saybrook, CT (US)

( * ) Notice: Subject to any disclaimer, the term of this patent is extended or adjusted under 35 U.S.C. 154(b) by 288 days.

(21) Appl. No.: 13/652,014

(22) Filed: Oct. 15, 2012

(65) Prior Publication Data

US 2013/0110946 A1       May 2, 2013

Related U.S. Application Data

(60) Provisional application No. 61/552,534, filed on Oct. 28, 2011.

(51) Int. Cl.
| | | |
|---|---|---|
| *G06F 15/16* | (2006.01) | |
| *G06Q 50/00* | (2012.01) | |
| *H04L 12/64* | (2006.01) | |

(52) U.S. Cl.
CPC ............ *G06Q 50/01* (2013.01); *H04L 12/6418* (2013.01)
USPC ........................................................ 709/206

(58) Field of Classification Search
CPC ............................ H04L 12/6418; G06Q 50/01
USPC ........................................................ 709/206
See application file for complete search history.

(56) References Cited

U.S. PATENT DOCUMENTS

| | | | | |
|---|---|---|---|---|
| 8,296,380 | B1 * | 10/2012 | Kelly et al. .................... | 709/206 |
| 8,639,762 | B2 * | 1/2014 | Rasmussen et al. .......... | 709/206 |
| 2006/0168001 | A1 * | 7/2006 | Lasater et al. ................ | 709/205 |
| 2009/0063995 | A1 * | 3/2009 | Baron et al. .................. | 715/753 |
| 2010/0121918 | A1 * | 5/2010 | Gottfried ...................... | 709/204 |
| 2011/0145348 | A1 * | 6/2011 | Benyamin et al. ............ | 709/206 |
| 2011/0238766 | A1 * | 9/2011 | Lew et al. ..................... | 709/206 |
| 2011/0320441 | A1 * | 12/2011 | Lee et al. ...................... | 707/723 |
| 2012/0265806 | A1 * | 10/2012 | Blanchflower et al. ....... | 709/204 |
| 2014/0136117 | A1 * | 5/2014 | Banian et al. .................. | 702/12 |
| 2014/0181208 | A1 * | 6/2014 | Robinson et al. ............. | 709/204 |

\* cited by examiner

*Primary Examiner* — Brian J Gillis
*Assistant Examiner* — Steve Lin
(74) *Attorney, Agent, or Firm* — Nixon Peabody LLP; Justin D. Swindells

(57) ABSTRACT

A method of conducting a real-time private group chat conversation using a social networking service to connect users to the conversation. A stream of text strings published by a public social networking service is monitored. The text strings are scanned to determine whether any of the strings include an action tag. If an action tag is found, a creator user account name that is attempting to initiate a private conversation is determined and a user account name and a title for the private conversation are read from the text string. A request is sent to the user account in the social networking service. The request includes the creator user account name and a URL for joining the private conversation. If the user account accepts the request by accessing the URL provided in the request from the social networking service, the user account is connected with the creator user account in a private conversation. Messages of the private conversation are communicated between all invited user accounts and the creator user account.

20 Claims, 5 Drawing Sheets

AD HOC GROUP CHAT USING A SOCIAL NETWORKING SERVICE

CROSS-REFERENCE TO RELATED APPLICATION

This application claims the benefit of U.S. Provisional Patent Application Ser. No. 61/552,534, filed Oct. 28, 2011, entitled "Ad Hoc Group Chat Using a Social Networking Service" which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a private messaging service that uses a public social networking service, such as Twitter, to invite users to a private conversation.

BACKGROUND OF THE INVENTION

Users of a social networking service, such as Twitter, can read private messages published by others only if those users are authorized followers of the posters. If the posters have not likewise accepted to be a follower of the users, then the users cannot post any private replies back to the posters. What is needed is a way of connecting users of a social networking service to a private group chat without requiring the users to be followers or friends of one another in the social networking service.

SUMMARY OF THE INVENTION

Major benefits of aspects of the present disclosure include:
Real-time chat in a browser—no install, no set up required;
no registration required to conduct a private conversation; just use twitter ID;
initiate via a command line using an "action tag," in the form of "!b," for example;
invite any number of participants (at inception and any point afterwards);
remove participants at any time;
turn a private conversation public and back again with one click;
archive and delete or make live again with on click;
The website user interface includes two components: left (index) and right (conversation). On smaller displays (width limited), the browser page is split on the fly into two separate subpages—an index subpage for an index of conversations, and a set of conversation subpages, one for each listed conversation. This is done on the fly as a dynamically updated page—not only of the content but of a multi-level page structure.

The user can switch between single page to dual split screen by rotating the device between portrait orientation and landscape orientation using the device's built-in gyroscope.

If a user is not currently known to the system, for example, they have at no point logged in to either join or create a conversation, a third-party software system invites the participants. The first time any user enters the service of the present disclosure, which is done by authorizing the service or application according to the present disclosure to use their Twitter credentials, such data is stored as to be able to send the invites from that user's account in future conversations.

A conversation can be cloned, and then a second set of filtered participants can be added. Any user ever invited to a conversation is added on the fly to the creator user's contact list.

To join multiple conversations together, each comment from the two initial conversations is combined into a merged thread, and then all of the users from the super-set are added into a new conversation.

The creator user can archive conversations, which are not deleted, but merely taken offline, meaning they instantly disappear for access by anyone other than the creator user. The creator user has access to a list of archived conversations, and the creator user need only "unarchive" an existing conversation to resume wherever it left off. An archived conversation can be taken to the deleted state again by the creator user.

Additional aspects of the invention will be apparent to those of ordinary skill in the art in view of the detailed description of various embodiments, which is made with reference to the drawings, a brief description of which is provided below.

DETAILED DESCRIPTION

Figure 1:
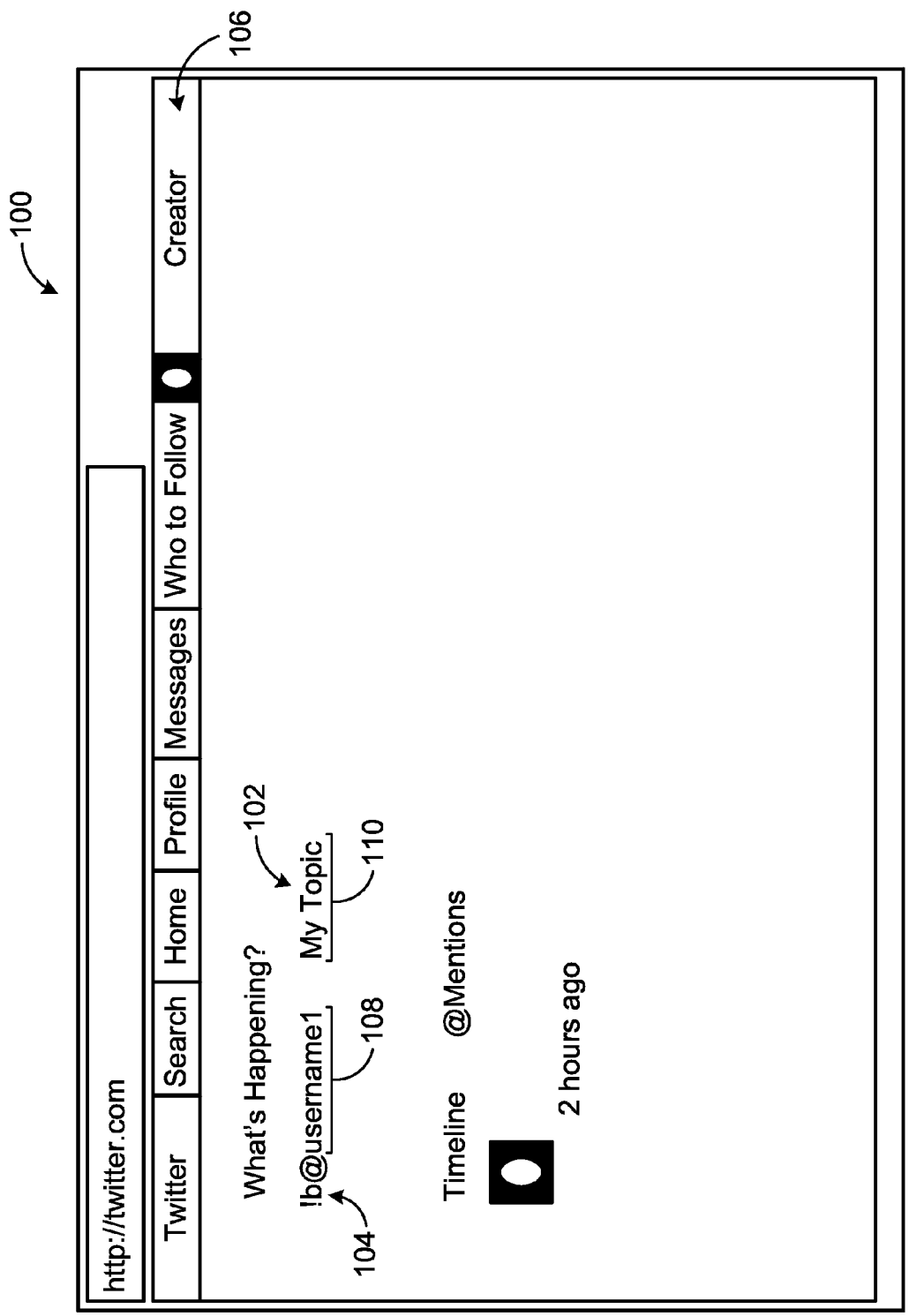
FIG. 1 is a screenshot of a browser displaying a page of a social networking service, such as Twitter, for a creator user account that wishes to initiate a private conversation with another Twitter user account regardless of whether that user is a follower.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A method of conducting a real-time private group chat conversation using a social networking service to connect users to the conversation is disclosed. Referring to FIG. 1, an example screen shot 100 of a browser displaying a page from a social networking service, such as Twitter. One or more controllers (not shown and referred to herein as "a" or "the" controller as referring to one or more controllers) monitors a stream of text strings published by a public social networking service. The controller scans the text strings to determine whether any of the text strings include an action tag 102 that includes a predetermined combination of characters 104. Responsive to the controller determining that a first of the text strings includes the action tag 102, the controller determines a creator user account name 106 that is attempting to initiate a private conversation and reads at least one user account name 108 in the first text string 102 and a title 110 for the private conversation to be initiated. The creator user account name 106 is associated with an externally published creator user account in the social networking service (e.g., the account name Creator is associated with a Twitter user account named Creator) and the user account name 108 is associated with an externally published user account in the social networking service (e.g., the user account name username1 is associated with a Twitter user account name username1).

Figure 2:
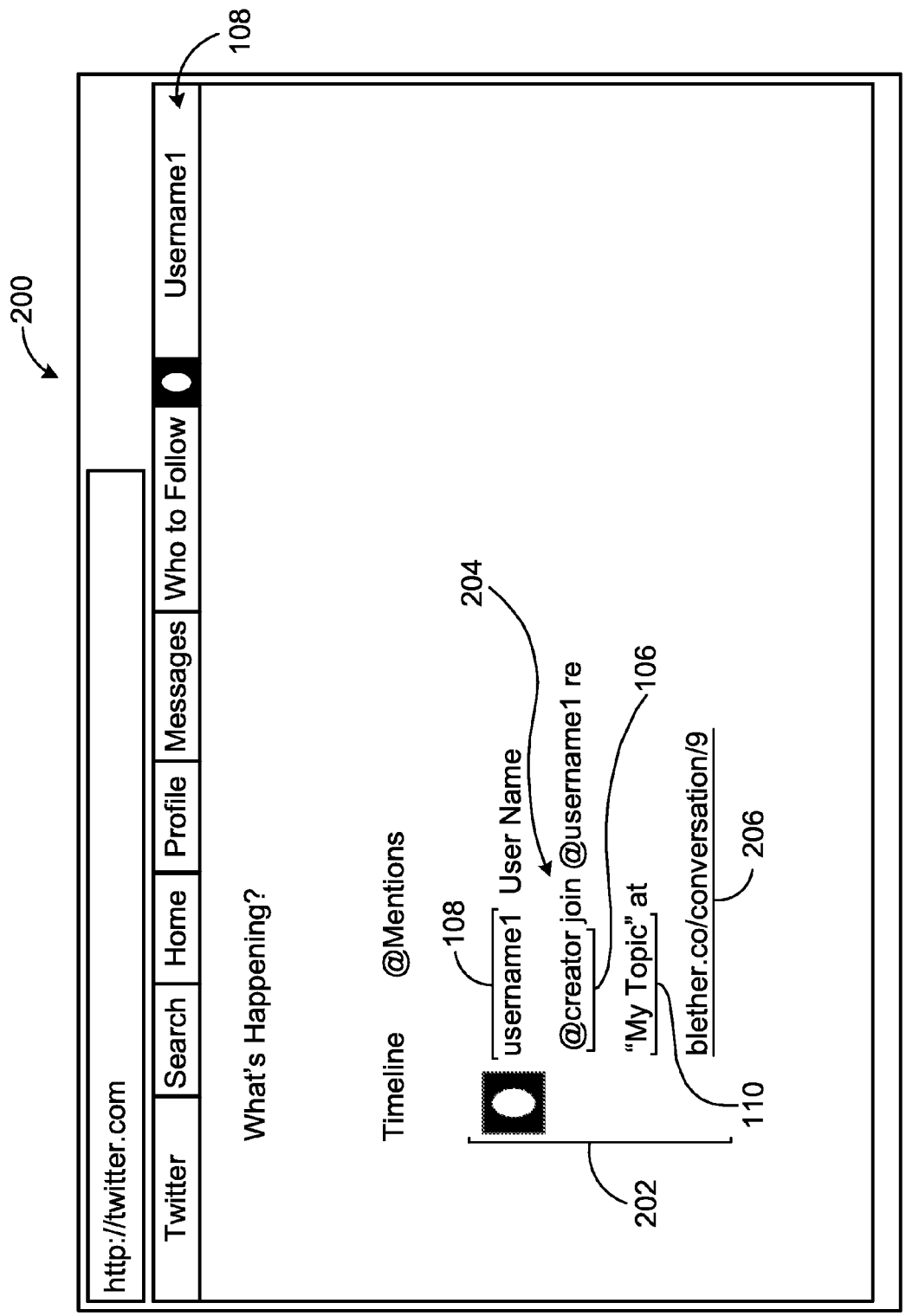
FIG. 2 is a screenshot of a browser displaying a page of a social networking service for a user account that has received an invitation by the creator user account to engage in a private conversation.

Referring to FIG. 2, the controller causes a request 202 to be sent to the user account 108 in the social networking service. The request includes an indication 204 ("join") of the request for the private conversation and the creator user account name and a uniform resource locator (URL) 206 for joining the private conversation. In the social networking service, the user account 108 accepts the request by directing a browser to access the URL 206 provided in the request 202 from the social networking service. In response, the controller connects the user account 108 with a creator user account 106 associated with the creator user account name in a private conversation. The controller communicates, using the controller, messages of the private conversation between the user account 108 and the creator user account 106 within a secure session of the browser. All of the messages are contained within the browser, within a secure session such as using an HTTPS protocol to communicate the messages. No plug-in, add-on, extension, or other feature needs to be downloaded to the browser. The browser can be web browser such as Internet Explorer, Firefox, Chrome, Safari, Opera, Skyfire, to name a few examples.

In response to a second user account accepting the request by directing a browser to access the URL provided in the request, the controller connects the second user account with the creator user account in the private conversation. For example, referring to the example shown in FIG. 1, to invite a second user account, the creator user account 106 adds a second user account name, e.g., username2, to the action tag 102 as follows "!b @username1 @username2 My Topic." The controller communicates messages of the private conversation among the user account 108 (username1), the second user account (e.g., username2 not shown), and the creator user account 106 (Creator) without using the public social networking service.

Figure 3:
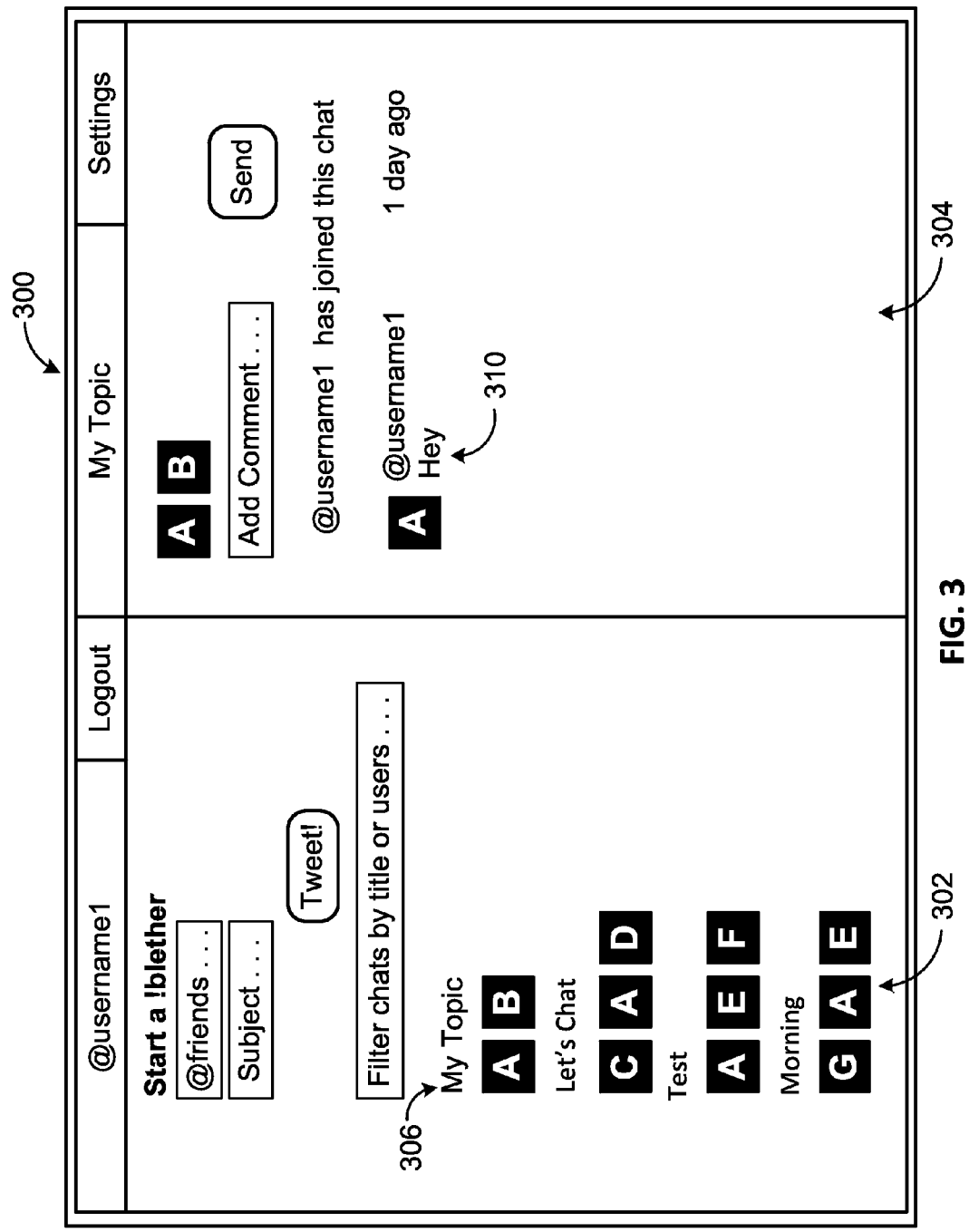
FIG. 3 is a screenshot of a browser displaying a page of a software application or applet according to the present disclosure showing a private conversation between the creator user account and the user account in a conversation subpage shown side-by-side with an index subpage in a landscape orientation.
Figure 4:
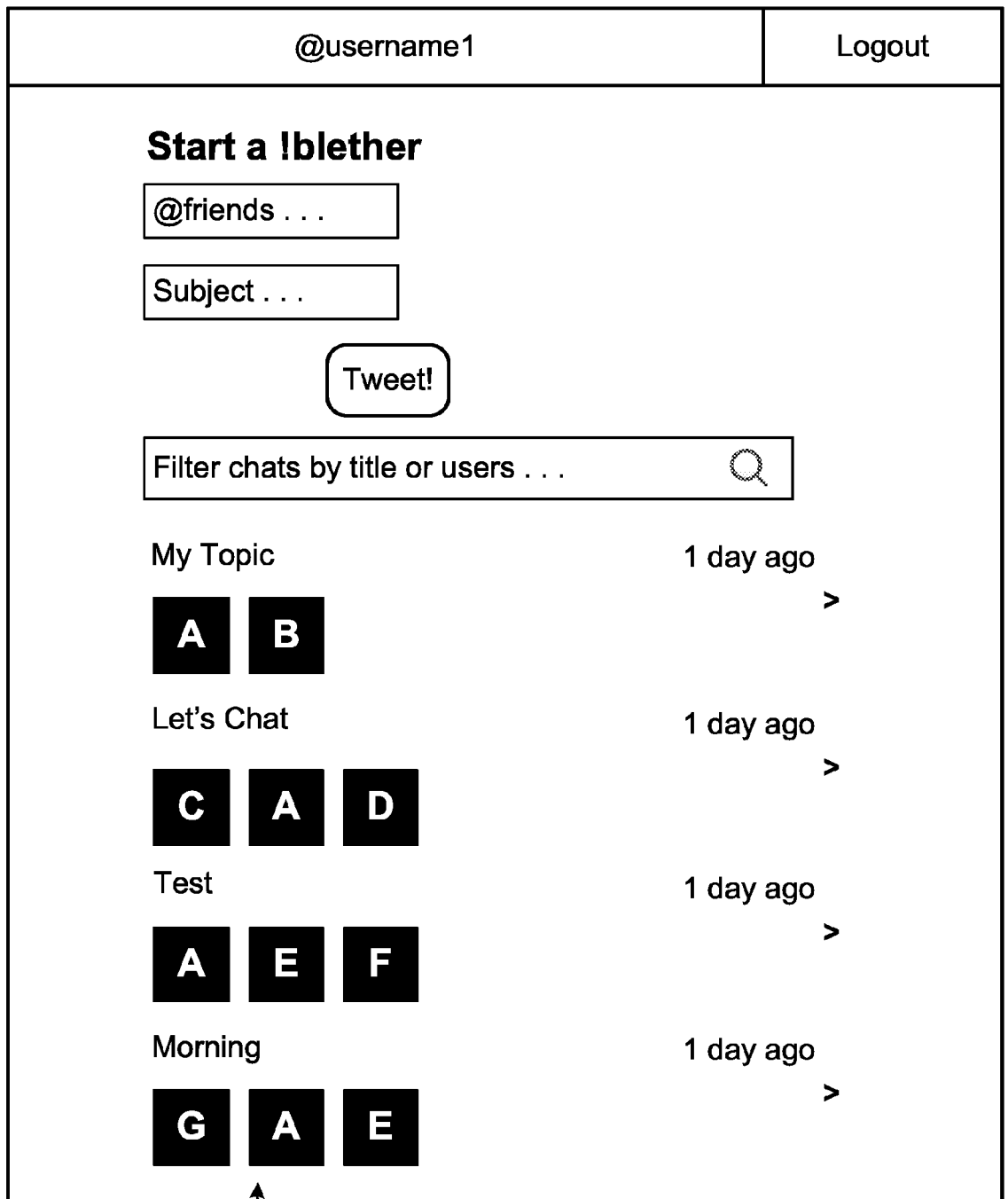
FIG. 4 is a screenshot of a browser displaying a page of a software application or applet according to the present disclosure showing an index subpage in a portrait orientation.
Figure 5:
FIG. 5 is a screenshot of a browser displaying a page of a software application or applet according to the present disclosure showing a conversation subpage in a portrait orientation.

The controller can also determine a type of the browser. Based on the determined type of the browser, the controller determines a type of device on which the browser is running. Based on the device type, the controller determines a display size of a display device on the device. Referring to FIG. 3, during the private conversation, the controller dynamically adjusts an arrangement of subpages 302, 304 displayed in the browser based on the display size and an orientation of the device. The orientation can be portrait (as shown in FIGS. 4-5) or landscape (as shown in FIG. 3). The device can be a desktop computer, a laptop computer, a portable cellular device having a wireless transceiver operable in one or more cellular frequency bands, such as the IPHONE cellular phone available from Apple, Inc., or a tablet computer, such as the IPAD 2 tablet available from Apple, Inc.

The subpages include an index subpage 302 that displays an index 306 of each of the private conversations in which the creator user account 106 or the user account 108 is participating and a conversation subpage 304 that displays at least some of the messages 310 of the private conversation exchanged between the user account 108 and the creator user account 106 such that the index subpage 302 and the conversation subpage 304 are arranged side-by-side in the landscape orientation (as shown in FIG. 3) and one after another in the portrait orientation (as shown in FIGS. 4-5).

When the device is a portable cellular device or a tablet computer having a gyroscope configured to detect the orientation of the device relative to a person holding the device (such as the IPHONE or IPAD 2 devices mentioned above), the controller automatically and dynamically adjusts the arrangement of the subpages between the portrait and landscape orientations based on the detected orientation of the device using the gyroscope.

In response to the communicating the messages, the controller invites, using the browser, multiple additional externally published user accounts in the social networking service to join in the private conversation. In response to the additional user accounts accepting the invitation to join in the private conversation, the controller communicates messages of the private conversation among the user account 108, the creator user account 106, and the additional user accounts (not shown). The number of user accounts that can join the private conversation is unlimited or limited only by storage requirements and network bandwidth. With today's massive storage capacity and network capacity, there is practically no limit to the number of users who can join in a private conversation.

The messages exchanged in the private conversation are text-based messages including alphanumeric characters, such as those that are exchanged on Twitter's social networking service.

The controller receives from the creator user account an indication to remove the user account from the private conversation. In response to receiving the indication to remove the user account, the controller thereafter disallows the user account from sending or receiving messages of the private conversation.

In response to the user account accepting the request, the controller stores credential information associated with the user account including the user account name. The controller retrieves the stored credential information associated with the user account in connection with a second request to join a second private conversation without requiring authorization of the user account to join the second private conversation.

The action tag 104 starts with at least one non-alphanumeric character and includes at least one alphanumeric character. The user account names 106, 108 are preceded by a topic hashtag. The non-alphanumeric character can be an exclamation point, the at least one alphanumeric character can be the letter b (thus, the action tag can be !b) and the topic hashtag can be an asperand (@) symbol (also commonly called the at sign), which is followed by a user name that together with the asperand forms a mention.

The public social networking service can be an online networking service that allows authorized users of the social networking service to send and post text-based messages, such as Twitter. The controller can be part of a server that is independent from the social networking service.

In the case of Twitter, each of the text strings have a 140 maximum character limit, but each of the messages of the private conversation is not so limited and have a limit greater than 140 characters. The user account and the creator user account are created and maintained by the social networking service (e.g., Twitter) that is external to the controller. The monitoring the text strings can be carried out using an application programming interface (API) connected to the social networking service.

The action tag 104 can be at the beginning of the text string 102 such that the predetermined combination of characters are the first characters of the text string (e.g., the characters !b).

The user account can receive the request as a text string from the social networking service. The communicating the messages of the private conversation can be carried out without passing any of the messages through the social networking service.

A non-transitory computer-readable medium having stored thereon computer-readable instructions for conducting a real-time private group chat conversation using a social networking service to connect users to the conversation, the instructions, when executed by one or more controllers, operable to carry out any method or algorithm disclosed herein.

The browser is preferably a web browser using an HTTP/S protocol. Advantageously, Twitter users who are not followers of one another can now chat with one another using the methods and systems disclosed herein. The command syntax for the action tag can be any combination of non-alphanumeric or alphanumeric characters. The combination should be distinct enough that it would not normally be expected to start a text string with the selected characters. I have selected !b as a particular combination, but it should be emphasized that any other suitable combination will suffice. The command parser simply needs to search for the action tag characters (!b in this example), and when it finds that sequence of characters, then parses the rest of the text string to extract the user account names and the title of the conversation and optionally other information in the command. Note that due to the character limit imposed by Twitter, there is a limit to the number of initial users can be invited to join a private conversation, but once the private conversation has been initiated, an unlimited number of additional users can be invited to join the conversation.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of conducting a real-time private group chat conversation using a social networking service to connect users to the conversation, the method comprising:
monitoring, using a controller, a stream of text strings published by a public social networking service;
scanning the text strings to determine whether any of the text strings include an action tag that includes a predetermined combination of characters;
responsive to determining that a first of the text strings includes the action tag, determining a creator user account name that is attempting to initiate a private conversation and reading at least one user account name in the first text string and a title for the private conversation to be initiated, the creator user account name being associated with an externally published creator user account in the social networking service and the user account name being associated with an externally published user account in the social networking service;
causing a request to be sent to the user account in the social networking service, the request including an indication of the request for the private conversation and the creator user account name and a uniform resource locator (URL) for joining the private conversation;
responsive to the user account accepting the request by directing a browser to access the URL provided in the request from the social networking service, connecting the user account with a creator user account associated with the creator user account name in a private conversation; and
communicating, using the controller, messages of the private conversation between the user account and the creator user account,
wherein the action tag starts with at least one non-alphanumeric character, includes at least one alphanumeric character, and is at the beginning of the text string such that the predetermined combination of characters are the first characters of the text string, and wherein the user account names are preceded by a hashtag.

2. The method of claim 1, further comprising:
responsive to a second user account accepting the request by directing a browser to access the URL provided in the request, connecting the second user account with the creator user account in the private conversation; and
communicating, using the controller, messages of the private conversation among the user account, the second user account, and the creator user account without using the public social networking service.

3. The method of claim 1, further comprising:
determining a type of the browser;
based on the determined type of the browser, determining a type of device on which the browser is running;
based on the device type, determining a display size of a display device on the device; and
during the private conversation, dynamically adjusting an arrangement of subpages displayed in the browser based on the display size and an orientation of the device.

4. The method of claim 3, wherein the orientation is portrait or landscape, and wherein the device is a desktop computer, a laptop computer, a portable cellular device having a wireless transceiver operable in one or more cellular frequency bands, or a tablet computer.

5. The method of claim 3, wherein the orientation is portrait or landscape and wherein the subpages include an index subpage that displays an index of each of the private conversations in which the creator user account or the user account is participating and a conversation subpage that displays at least some of the messages of the private conversation exchanged between the user account and the creator user account such that the index subpage and the conversation subpage are arranged side-by-side in the landscape orientation and one after another in the portrait orientation.

6. The method of claim 5, wherein the device is a portable cellular device or a tablet computer having a gyroscope configured to detect the orientation of the device relative to a person holding the device, and wherein the arrangement of the subpages is automatically and dynamically adjusted between the portrait and landscape orientations based on the detected orientation of the device using the gyroscope.

7. The method of claim 1, further comprising:
responsive to the communicating the messages, inviting using the browser a plurality of additional externally published user accounts in the social networking service to join in the private conversation;
responsive to the additional user accounts accepting the invitation to join in the private conversation, communicating messages of the private conversation among the user account, the creator user account, and the additional user accounts, wherein the number of user accounts that can join the private conversation is unlimited.

8. The method of claim 1, wherein the messages are text-based messages including alphanumeric characters, and wherein the messages are displayed in the respective browsers used by the user account and the creator user account to access the URL.

9. The method of claim 1, further comprising, receiving from the creator user account an indication to remove the user account from the private conversation, and responsive to receiving the indication to remove the user account, thereafter disallowing the user account from sending or receiving messages of the private conversation.

10. The method of claim 1, further comprising:
responsive to the user account accepting the request, storing credential information associated with the user account including the user account name; and
retrieving the stored credential information associated with the user account in connection with a second request to join a second private conversation without requiring authorization of the user account to join the second private conversation.

11. The method of claim 1, wherein the non-alphanumeric character is an exclamation point, the at least one alphanumeric character is the letter b, and the hashtag is an asperand symbol.

12. The method of claim 1, wherein the public social networking service is an online networking service that allows authorized users of the social networking service to send and post text-based messages.

13. The method of claim 1, wherein the controller is part of a server that is independent from the social networking service.

14. The method of claim 1, wherein the social networking service is accessible from a uniform resource locator that includes twitter.

15. The method of claim 1, wherein each of the text strings have a 140 maximum character limit, and wherein each of the messages of the private conversation have a limit greater than 140 characters.

16. The method of claim 1, wherein the user account and the creator user account are created and maintained by the social networking service that is external to the controller.

17. The method of claim 1, wherein the monitoring is carried out using an application programming interface (API) connected to the social networking service.

18. The method of claim 1, wherein the user account receives the request as a text string from the social networking service.

19. The method of claim 1, wherein the communicating is carried out without passing any of the messages through the social networking service.

20. A non-transitory computer-readable medium having stored thereon computer-readable instructions for conducting a real-time private group chat conversation using a social networking service to connect users to the conversation, the instructions, when executed by one or more controllers, operable to:
monitor, using a controller, a stream of text strings published by a public social networking service;
scan the text strings to determine whether any of the text strings include an action tag that includes a predetermined combination of characters;
responsive to determining that a first of the text strings includes the action tag, determine a creator user account name that is attempting to initiate a private conversation and reading at least one user account name in the first text string and a title for the private conversation to be initiated, the creator user account name being associated with an externally published creator user account in the social networking service and the user account name being associated with an externally published user account in the social networking service;
cause a request to be sent to the user account in the social networking service, the request including an indication of the request for the private conversation and the creator user account name and a uniform resource locator (URL) for joining the private conversation;
responsive to the user account accepting the request by directing a browser to access the URL provided in the request from the social networking service, connect the user account with a creator user account associated with the creator user account name in a private conversation; and
communicate, using the controller, messages of the private conversation between the user account and the creator user account, the messages being displayed in the respective browsers used by the user account and the creator user account to access the URL,
wherein the action tag starts with at least one non-alphanumeric character, includes at least one alphanumeric character, and is at the beginning of the text string such that the predetermined combination of characters are the first characters of the text string, and wherein the user account names are preceded by a hashtag.

* * * * *